Nov. 7, 1950 G. MUFFLY 2,528,703

CONSTANT AMPLITUDE OSCILLATOR

Filed Jan. 22, 1945

Inventor
GARY MUFFLY

By A. M. Houghton
His Attorney

Patented Nov. 7, 1950 2,528,703

UNITED STATES PATENT OFFICE 2,528,703

CONSTANT AMPLITUDE OSCILLATOR

Gary Muffly, Penn Township, Allegheny County, Pa., assignor to Gulf Research & Development Company, Pittsburgh, Pa., a corporation of Delaware Application January 22, 1945, Serial No. 573,918

8 Claims. (Cl. 175—183)

Figure 1:
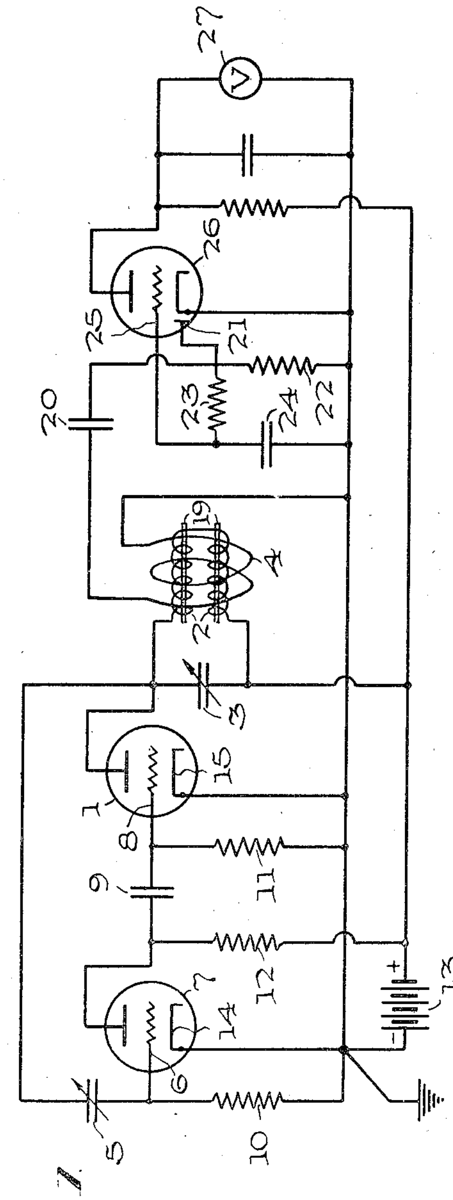

This invention concerns a thermionic vacuum tube oscillator having a high degree of amplitude stability and which is particularly advantageous when used with certain magnetic detecting devices. This oscillator is self-compensating with respect to supply voltage variations and may even be made to over-compensate. The oscillator is not designed for frequency stability but for amplitude stability.

In the design of vacuum tube oscillators it is often important to consider the stability of its output. This stability may be of two kinds. Certain applications require that the output have frequency stability i. e., that it does not drift or deviate from the frequency on which it was originally set. Other applications require that the output voltage remain constant, i. e., that it should have amplitude stability. The present invention is aimed at obtaining amplitude stability. Amplitude stability is particularly important when the oscillator is used to excite such devices as magnetic, electric or electronic detectors which must be sensitive to small variations in a larger background.

There are several things which may cause an oscillator to change its output voltage or amplitude. Chief among these causes is a change in plate supply voltage to the vacuum tube. This plate or "B" supply may be obtained from batteries or from a "B" eliminator power supply operated from say 110 volt mains. In the former case the batteries tend to run down with a gradual decrease in voltage. In the latter case the voltages developed by the power supply will vary with the main line voltage. Either will tend to cause undesirable fluctuations in oscillator output voltage.

In order to avoid changes in oscillator output voltage, numerous methods and circuits have been devised which would compensate to some extent for the effect of changes in plate supply voltage. Ordinarily a vacuum tube oscillator has an output amplitude which varies rapidly with the plate supply voltage. In general the percentage output variation is several times the percentage change in plate voltage. Such a condition is often serious in sensitive apparatus which must be operated from a power line or other source subject to voltage variations. Special oscillators have been built before to combat this difficulty, but they have generally been complicated and not too satisfactory for minute variations. Furthermore, the degree of compensation heretofore attained was not complete, so that the result was to reduce but not eliminate the variations.

Such compensated oscillators usually comprise a master oscillator, an amplifier, and an amplitude control circuit. Thus the heretofore common devices require considerable more equipment than a simple oscillator and the resulting control is imperfect. Often, though fairly satisfactory for gradually changing voltages, they are seriously disturbed by transient voltage surges such as are common on power lines.

It is accordingly an object of this invention to provide an oscillator which has a high degree of amplitude stability, for energizing or exciting magnetic, electronic or other devices of high sensitivity.

Another object of this invention is to provide an oscillator which is simple and inexpensive and which will have a steady output voltage even if the supply voltage is not steady.

Still another object is to provide an oscillator which is completely self-compensated for variations in supply voltage, that is, one whose output voltage will remain constant even though the supply voltage has transient surges.

A further object is to provide an oscillator which may be made to over-compensate supply voltage variations so that it will supply the necessary compensation required to take care of variations set up in associated circuits.

The invention will be described particularly in connection with a magnetic detecting element such as is disclosed by Vacquier application Serial No. 403,455, filed July 21, 1941, now Patent No. 2,406,870. This detecting element is capable of detecting small variations in a magnetic field such as the field of the earth and spurious indication due to changes in supply voltage are avoided by the use of this invention. My invention is however not restricted hereto but may be applied to other devices requiring similar amplitude stability.

Figure 2:
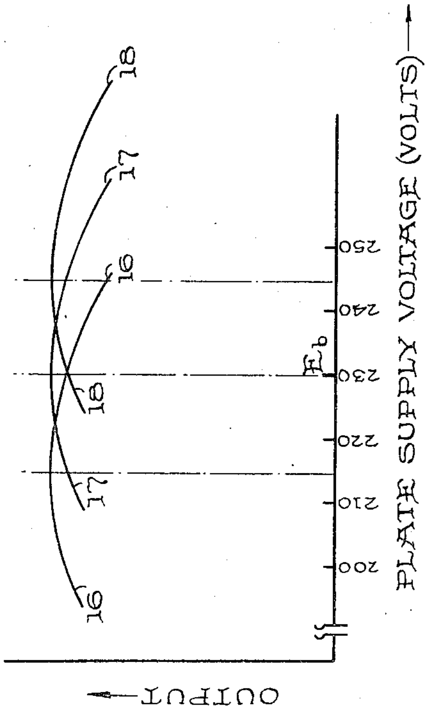

Further details of the invention may be understood by reference to the figures of the accompanying drawing in which:

Fig. 1 is a schematic circuit diagram of the oscillator and magnetic detecting element, and Fig. 2 is a graph showing how the output voltage varies with plate supply voltage and with the capacity of one of the coupling condensers.

Referring to Fig. 1, the circuit consists essentially of a two-stage amplifier feeding back on itself and supplying energy to a magnetic detecting element whose output voltage is to be stabilized against supply voltage fluctuations. The frequency of oscillation is determined by a tuned inductance in the plate circuit of one stage, this inductance in the present instance being a magnetic detecting element and its associated indicating circuit. Other elements of the circuit are resistors and capacitors of the type used in a conventional resistance coupled amplifier.

In Fig. 1, tube 1 has an output circuit comprising the inductances 2 which form part of the magnetic detecting element being excited and whose output is to be stabilized against variations in plate supply device 13. Device 13 may be a battery or a power operated plate supply of any type. The inductances 2 are connected in series and parallel-tuned with a small capacitance 3, this circuit determining the operating frequency of the oscillator. The frequency in this appliance need not necessarily remain accurately fixed. The frequency of oscillation is not important and may be any convenient value. I have used frequencies in the neighborhood of 12,000 cycles which were obtained with a condenser 3 of capacity .0005 mfd. As disclosed in the Vacquier application Serial No. 403,455 the coils 2 are wound on two slender cores 19 of high-permeability alloy such as permalloy, and are connected so that cores 19 are oppositely magnetized. Around the two cores and coils is wound a common secondary 4. Cores 19 and their exciting coils 2 together with secondary coil 4 comprise a magnetic detecting unit which is sensitive to variations in the local magnetic field, the strength of this field being indicated by meter 27 as will be described later.

The plate of tube 1 feeds through a small coupling condenser 5 to grid 6 of tube 7. Tube 7 feeds its plate output back to the grid 8 of tube 1 by means of coupling condenser 9. Tube 7 thus acts as the phase inverter for the signal fed back into the grid of tube 1, this being a necessary condition for maintenance of sustained oscillations. Furthermore, tube 7 contributes to the amplitude control and thus serves two functions. Grid resistors 10 and 11 are of relatively high values so that both tubes will operate with high values of grid bias. When the circuit is properly adjusted for voltage stability the tube biases will be considerably greater than cut-off. Plate resistor 12 is chosen to give a moderate plate current with a D.-C. plate voltage roughly half of the voltage of plate supply 13. The cathodes 14 and 15 may be connected directly to the negative terminal of the plate supply 13.

Minimizing the susceptibility of the oscillator to plate-supply voltage variations depends on the relative values chosen for the various components, but has been found to be influenced particularly by the value of condenser 5. It has been found convenient to use an adjustable condenser here in order to achieve perfect amplitude control. The reactance of condenser 5 at the frequency of oscillation is roughly of the order of magnitude of resistance 10.

Tubes 1 and 7 and their associated circuits constitute the exciting means for the detector coils 2. Secondary coil 4 is connected through condenser 20 to diode section 21 of tube 26. This diode acts as a peak rectifier generating a negative D.-C. voltage across resistor 22. Resistor 23 and condenser 24 serve as a filter to eliminate the A.-C. detector signal from grid 25 of tube 26. The plate voltage of tube 26 is read on voltmeter 27. The reading of meter 27 will depend on the magnetic field applied to the cores 19 and will be an indication or measure thereof. This voltage will vary quite linearly with changes of magnetic field over a range of 30 to 200 volts, for example. Small changes of the field which are to be detected may, however, cause only a fraction of a volt change in this range. Therefore, the voltage indicated by meter 27 must be held very constant regardless of fluctuations in the plate supply source 13. As an example of one application of this invention, the magnetic detecting element may be employed in a submarine mine capable of detecting the approach of even small steel vessels, and in this instance voltage changes as small as 0.1 volt had to be detected at the plate of tube 26 by means of an amplifier in place of meter 27. Since the unit was under water at the end of a long single-conductor cable with ground return, it was impossible to hold the plate supply voltage constant enough to achieve the necessary stability with any ordinary type of oscillator-detector circuit. With the use of this invention the above stability was accomplished, supply voltage changes having negligible effect once the circuit is adjusted as will be explained in connection with Fig. 2.

Fig. 2 shows the effect of changing the capacity of condenser 5. The output is plotted as a function of supply voltage for three different values of capacity, giving the three curves 16, 17 and 18. Curve 16 would be for a large value of condenser 5. Curve 17 would be for an intermediate value and curve 18 for a small value of condenser 5. Curve 17 would be optimum for a plate supply voltage $E_b$ of 230 v. because small deviations in the voltage could hardly affect the output since the curve flattened off at this point. Likewise, curves 16 and 18 would be best at approximately 215 and 245 volts respectively.

It is not always desirable to operate at the peak of the curves of Fig. 2. For example, the output of tube 26 may be fed into another circuit which is itself dependent on the plate supply voltage. This might be another vacuum tube circuit which is supplied from the same source of power. The variations of such additional circuits with respect to supply voltage may be compensated by selecting an operating point on the curves of Fig. 2 where the effect of supply voltage changes on the oscillator will just offset the changes in the rest of the equipment to which it connects.

A quantitative analytical expression for the behavior of the circuit Fig. 1 cannot be written because it is complicated by many non-linear effects. In the detector cores 19 a high degree of saturation is obtained, and the characteristics of the peak-type rectifier tube 26 are involved. Because of the highly-saturated cores 19, the circuit of tubes 1 and 7 does not operate as a simple oscillator and by adjusting the parameters to a combination of special conditions as herein disclosed an unusually high degree of stability is obtained. Changes in phase, wave shape, and frequency of oscillation probably all enter into the stabilizing action, but by making the adjustments indicated by Fig. 2 against the output readings of meter 27, a point of high stability is easily found.

The following qualitative explanation will indicate the nature of the stabilizing action in Fig. 1. Tube 1 is biased by grid rectification of the signal fed back through tube 7 and condenser 9. This bias is high compared to cutoff. Since resistor 11 is high, say half a megohm, and condenser 9 is fairly large, grid 8 acts as a peak-type rectifier or approximately so. The D.-C. bias on grid 8 thus approximates the peak swing of the oscillatory frequency. Whatever the grid swing, the grid voltage is always driven just to the point where a little grid current flows. This fact limits the peak plate current. In addition to this, the length of time the plate current pulses flow decreases when the grid swing and bias are increased simultaneously. When the bias of a tube is just equal to the cutoff value, for instance, the plate current flows for a full half-cycle, but as the bias increases the plate current flows for a smaller and smaller fraction of a cycle, even though the peak current value is held substantially constant by increasing the signal swing. This is what happens in tube 1. When the plate supply voltage increases, tube 7 puts out a stronger signal, but the increase is counteracted by the tendency of tube 1 to put out less as its grid excitation and bias are increased. Condenser 5 is usually proportioned so that its time constant in combination with resistor 10 is small compared to the period of oscillation. If made too large, it would cause tube 7 to have an output that also decreased with signal input, and the oscillator as a whole would then be over-compensated too highly for most uses. Thus it is desirable to adjust this condenser for optimum results as was explained in connection with Fig. 2.

It is important that the output stage be operated with higher than cutoff bias, or class C as described in the art. The grid voltage, however, should not be driven much into the positive-voltage or grid current zone. The other stage may be of other types than that illustrated. It may use other coupling elements than condenser 5 and resistors 10 and 12. For example, inductive coupling may be used. An adjustable coil may couple grid 6 to coil 2, and an inductance or choke may replace resistor 12.

Another important factor is the high degree of magnetic saturation reached in cores 10. This affects the current in coils 2 and the current induced in coil 4 in such a way that changes in wave shape occur. The resulting change in form factor affects the reading of meter 27 in such a way as to contribute to the stabilizing effect when no changes in ambient field occur. Due to the high magnetic permeability of the material from which cores 10 are made and the nature of the detecting device, the existence of this saturated condition does not impair the sensitivity of the detecting element to changes in magnetic field.

Having thus indicated in the above specification a means for accomplishing the objects of my invention and for applying it to a specific useful purpose, I desire not to be limited to such purpose, but include other advantageous uses of my invention which will become apparent to one skilled in the art.

What I claim as my invention is:

1. An apparatus responsive to magnetic fields comprising a flux valve magnetometric apparatus having magnetic core material of minimal cross-sectional area, a two-stage class C vacuum tube oscillator energizing said magnetometric apparatus and having adjustable feedback, a power supply connected to said oscillator, a coil in energy-receiving relation to said magnetometric apparatus, a rectifier connected to said coil, an amplifier connected to said rectifier and powered by said power supply and an output indicator connected to said amplifier.

2. An apparatus responsive to magnetic fields comprising a flux valve magnetometric apparatus having magnetic core material of minimal cross-sectional area, a two-stage class C vacuum tube oscillator energizing said magnetometric apparatus and having adjustable feedback, a power supply connected to said oscillator, a coil in energy-receiving relation to said magnetometric apparatus, a rectifier connected to said coil, an amplifier connected to said rectifier and powered by said power supply, an output indicator connected to said amplifier and means for adjusting the feedback in aforesaid oscillator to control the effect of power supply voltage changes on the output indicator.

3. An apparatus responsive to magnetic fields comprising a flux valve magnetometric apparatus having magnetic core material of minimal cross-sectional area, a two-stage class C vacuum tube oscillator having feedback and energizing said magnetometric apparatus, a power supply connected to said oscillator, a coil in energy-receiving relation to said magnetrometric apparatus, a rectifier connected to said coil, an amplifier connected to said rectifier and powered by said power supply and an output indicator connected to said amplifier, the oscillator feedback having such value that the indicated output is substantially independent of supply voltage fluctuations.

4. A vacuum-tube operated magnetic detecting apparatus comprising a flux valve magnetometric apparatus, a signal biased class C vacuum tube exciting stage circuit connected to said flux valve, said exciting stage having a relatively large grid resistor and grid-coupling condenser to provide peak rectification in its grid circuit, a second stage providing feedback around said exciting stage, adjustable coupling means controlling the amount of feedback from said second stage to said first stage and means for indicating the output of the magnetometric apparatus.

5. A vacuum-tube operated magnetic detecting apparatus comprising a flux valve magnetometric apparatus, a signal biased class C vacuum tube exciting stage circuit connected to said flux valve, said exciting stage having a relatively large grid resistor and grid-coupling condenser to provide peak rectification in its grid circuit, a second stage providing feedback around said exciting stage, means for indicating the output of the magnetometric apparatus and coupling means controlling the amount of feedback from said second stage to said first stage, said coupling means comprising a condenser having a value such that the flux valve output is substantially independent of supply voltage.

6. A vacuum-tube operated magnetic detecting apparatus comprising a flux valve magnetometric apparatus, a signal biased class C vacuum tube exciting stage circuit connected to said flux valve, said exciting stage having a relatively large grid resistor and grid-coupling condenser to provide peak rectification in its grid circuit, a second stage providing feedback around said exciting stage, means for indicating the output of the magnetometric apparatus and coupling means controlling the amount of feedback from said second stage to said first stage, said coupling means introducing feedback in amount such that the flux valve output is substantially independent of supply voltage.

7. A vacuum-tube oscillator having controlled response to supply voltage fluctuations comprising a flux valve apparatus, a vacuum-tube oscillator having a signal biased class C output stage exciting said flux valve and with its grid circuit arranged to act substantially as a peak rectifier, an additional amplifier stage which feeds back oscillatory energy from the plate circuit of said output stage to the grid circuit of said output stage, adjustable coupling means in said feedback circuit, and means for indicating the output of the flux valve apparatus.

8. A constant amplitude vacuum tube oscillator comprising a flux valve, a signal biased class C oscillator tube having its grid circuit arranged to act substantially as a peak rectifier and its plate circuit energizing said flux valve, an additional amplifier tube connected to feedback oscillatory energy from the plate circuit of said oscillator tube to the grid circuit of said oscillator tube, a power supply energizing said tubes, means for indicating the output of said flux valve, and means for adjusting the feedback energy of the amplifier tube so that the flux valve output is substantially independent of supply voltage.

GARY MUFFLY.

REFERENCES CITED

The following references are of record in the file of this patent:

UNITED STATES PATENTS

| Number | Name | Date |
|---|---|---|
| 1,568,065 | Gunn | Jan. 5, 1926 |
| 1,943,619 | Mudge et al. | Jan. 16, 1934 |
| 2,016,977 | Thomas | Oct. 8, 1935 |
| 2,047,609 | Antranikian | July 14, 1936 |
| 2,053,154 | La Pierre | Sept. 1, 1936 |
| 2,213,357 | Barth | Sept. 3, 1940 |
| 2,252,059 | Barth | Aug. 12, 1941 |
| 2,406,870 | Vacquier | Sept. 3, 1946 |
| 2,407,202 | Vacquier | Sept. 3, 1946 |
| 2,413,808 | Buckley | Feb. 18, 1947 |
| 2,438,964 | Cunningham | Apr. 6, 1948 |
| 2,447,849 | Fay | Aug. 24, 1948 |

FOREIGN PATENTS

| Number | Country | Date |
|---|---|---|
| 460,298 | Great Britain | Jan. 25, 1937 |